(12) United States Patent
Weiser et al.

(10) Patent No.: US 11,436,552 B2
(45) Date of Patent: Sep. 6, 2022

(54) SHORT RANGE DIGITAL RADIO LOCATION DETERMINATION TO FACILITATE PETROLEUM TRANSPORT

(71) Applicant: FMC Technologies, Inc., Houston, TX (US)

(72) Inventors: Frederick G. Weiser, Houston, TX (US); James M. Pettinato, Jr., Houston, TX (US); Iulian Constantinescu, Houston, TX (US)

(73) Assignee: FMC TECHNOLOGIES, INC., Houston, TX (US)

( * ) Notice: Subject to any disclaimer, the term of this patent is extended or adjusted under 35 U.S.C. 154(b) by 433 days.

(21) Appl. No.: 16/617,549

(22) PCT Filed: Jun. 7, 2018

(86) PCT No.: PCT/US2018/036489
§ 371 (c)(1),
(2) Date: Nov. 27, 2019

(87) PCT Pub. No.: WO2018/226980
PCT Pub. Date: Dec. 13, 2018

(65) Prior Publication Data
US 2020/0134553 A1 Apr. 30, 2020

Related U.S. Application Data

(60) Provisional application No. 62/516,253, filed on Jun. 7, 2017.

(51) Int. Cl.
*G01S 11/08* (2006.01)
*G06Q 10/08* (2012.01)
*G01S 13/76* (2006.01)

(52) U.S. Cl.
CPC .......... *G06Q 10/0832* (2013.01); *G01S 11/08* (2013.01); *G01S 13/765* (2013.01)

(58) Field of Classification Search
CPC .............................. G01S 11/08; G01S 13/765
(Continued)

(56) References Cited

U.S. PATENT DOCUMENTS

2003/0233189 A1  12/2003  Hsiao et al.
2004/0102876 A1 *  5/2004  Doane .................. B64D 39/00
                                                 701/9
(Continued)

FOREIGN PATENT DOCUMENTS

DE           10344821 A1 *  4/2004  ............. G06Q 10/08

OTHER PUBLICATIONS

Office Action issued in corresponding European Application No. 18738405.2, dated Oct. 14, 2020 (10 pages).
(Continued)

*Primary Examiner* — Harry K Liu
(74) *Attorney, Agent, or Firm* — Osha Bergman Watanabe & Burton LLP

(57) ABSTRACT

A method may include the following steps: determining, based on timing measurements between a first digital radio communication device (DRCD) node and at least a second DRCD node, a distance between the first DRCD disposed on a tanker and the second DRCD disposed about a loading/unloading facility; and facilitating, in response to determining a position based on the timing measurements, fluid payload loading/unloading of the tanker at the loading/unloading facility.

32 Claims, 7 Drawing Sheets

(58) Field of Classification Search
USPC .......................................................... 705/332
See application file for complete search history.

(56) References Cited

U.S. PATENT DOCUMENTS

| | | |
|---|---|---|
| 2014/0129038 A1 | 5/2014 | Finnell et al. |
| 2014/0149004 A1 | 5/2014 | Best et al. |
| 2015/0198950 A1* | 7/2015 | Kallaway ................ B63B 27/34 |
| | | 701/21 |

OTHER PUBLICATIONS

Ussmueller, Thomas et al., "Roundtrip-Time-of-Flight Based Localization of Passive Multi-Standard RFID-Tags", Wireless Information Technology and Systems (ICWITS), IEEE, Nov. 2012 (4 pages).
Decawave: "TREK1000: Two-Way-Ranging (TWR) RTLS IC Evaluation Kit", Jan. 1, 2015, 2 pages, XP055501740, retrieved from the Intenet: URL: https://www.decawave.com/sites/default/files/trek1000_product_brief.pdf.
Decawave: "Overview of DWM1000 Module", Jan. 1, 2013, 2 pages, XP055501757, Dublin D08 T6YA, Ireland, retrieved from the Internet: URL: https://www.decawave.com/sites/default/files/dwm1000-product-brief_0.pdf.
International Search Report issued in Application No. PCT/US2018/036489, dated Sep. 13, 2018 (5 pages).
Written Opinion issued in Application No. PCT/US2018/036489, dated Sep. 13, 2018 (7 pages).

* cited by examiner

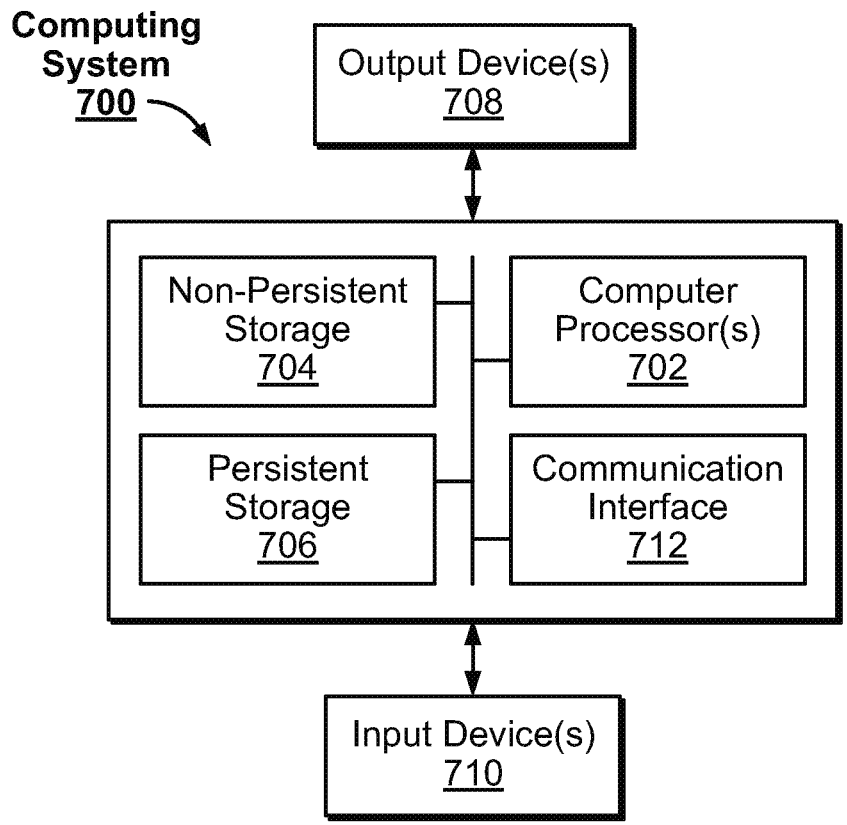
FIG. 7.1
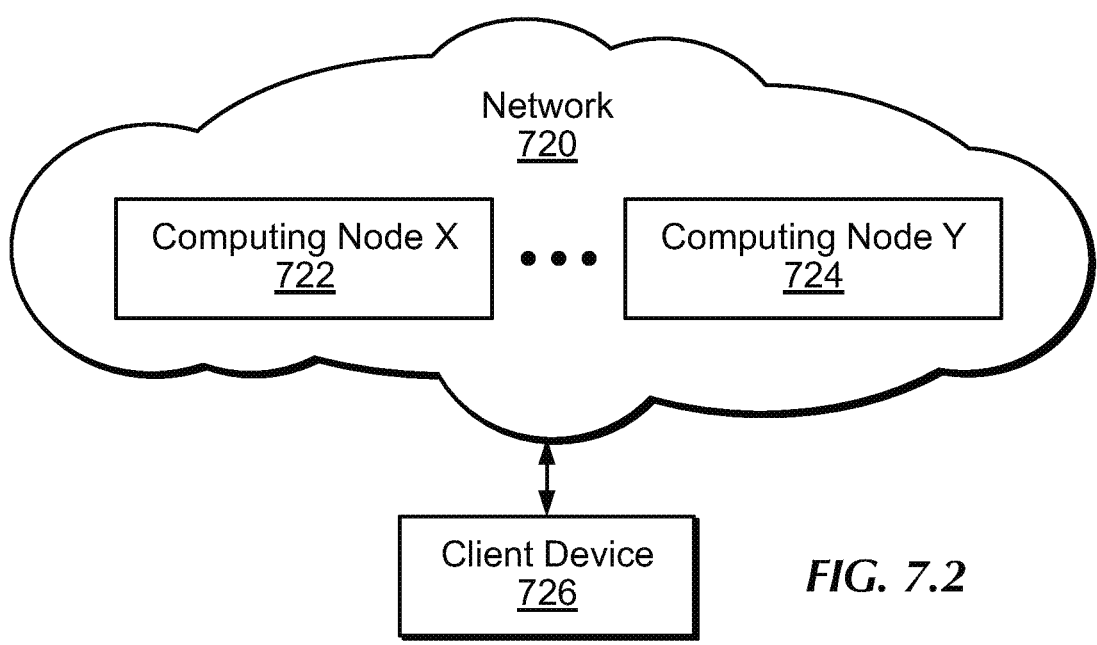
FIG. 7.2

SHORT RANGE DIGITAL RADIO LOCATION DETERMINATION TO FACILITATE PETROLEUM TRANSPORT

BACKGROUND

One of the problems faced in North American petroleum road tanker loading terminals is contamination and product disposal that are results of cross coupling, which is loading product into an incorrect compartment on a tanker (e.g., truck).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure may relate to a method which may include the following steps: determining, based on a timing measurement between a first digital radio communication device (DRCD) node and a second DRCD node, a distance between the first DRCD disposed on a tanker and the second DRCD disposed about a loading/unloading facility; and facilitating, in response to determining the distance based on the timing measurement, fluid payload loading/unloading of the tanker at the loading/unloading facility.

In another aspect, the present disclosure may relate to a computer program product including computer readable program code for determining, based on a timing measurement between a first digital radio communication device (DRCD) node and a second DRCD node, a distance between the first DRCD disposed on a tanker and the second DRCD disposed about a loading/unloading facility, and facilitating, in response to determining the distance based on the timing measurement, fluid payload loading/unloading of the tanker at the loading/unloading facility.

In another aspect, the present disclosure may relate to a distribution system which may include one or more computer processors, and a terminal automation system. The terminal automation system may include instructions which, when executed, cause the one or more computer processors to determine, based on a timing measurement between a first digital radio communication device (DRCD) node and a second DRCD node, a distance between the first DRCD disposed on a tanker and the second DRCD disposed about a loading/unloading facility; and facilitate, in response to determining the distance based on the timing measurement, fluid payload loading/unloading of the tanker at the loading/unloading facility.

Other aspects and advantages will be apparent from the following description and the appended claims.

BRIEF DESCRIPTION OF DRAWINGS

FIGS. 7.1 and 7.2 show a computing system in accordance with one or more embodiments.

DETAILED DESCRIPTION

Figure 1:
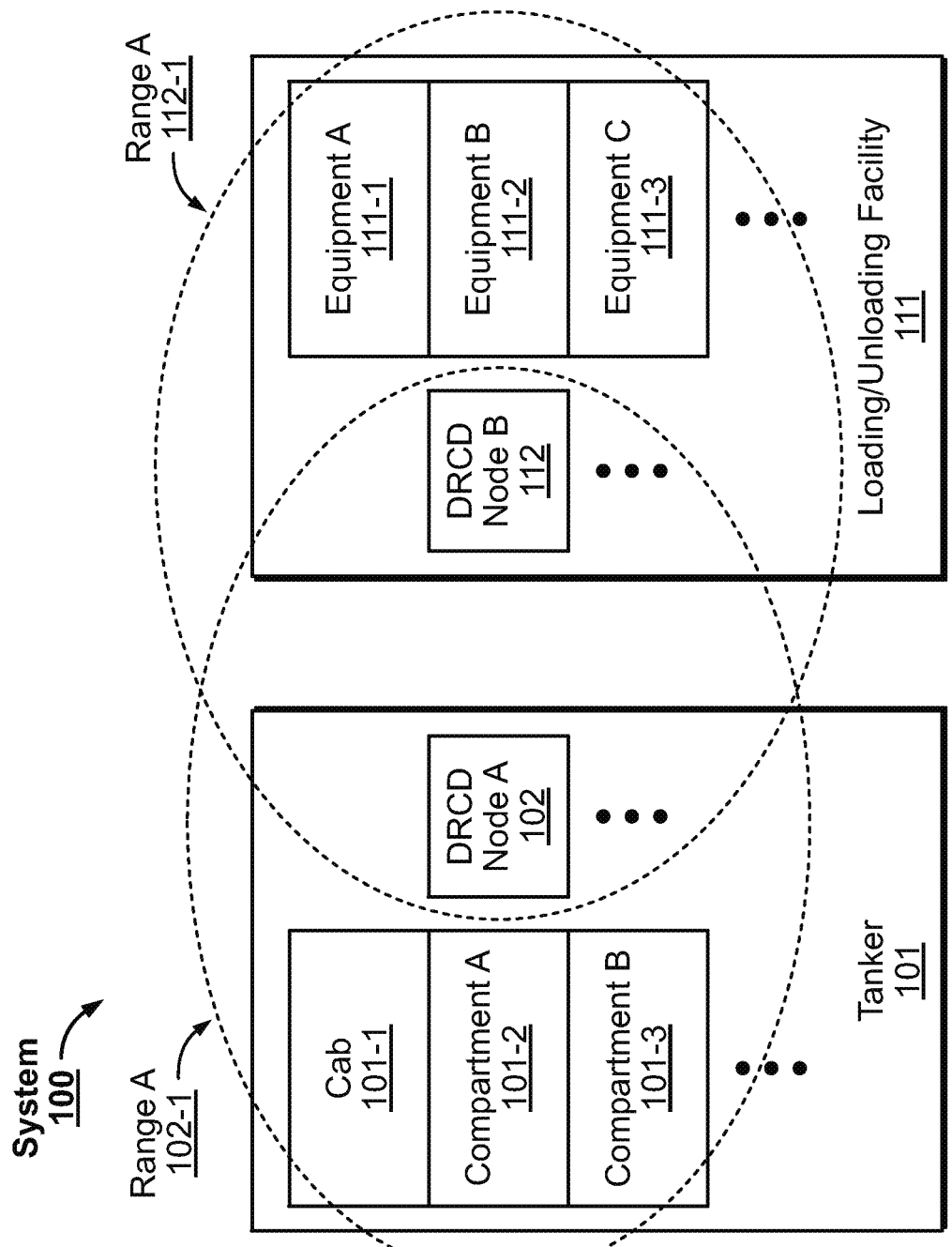
FIG. 1 shows a system diagram in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the present disclosure, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, example embodiments of the present disclosure provide a system, a method, and a computer readable medium for facilitating petroleum loading/unloading of a tanker at a loading/unloading facility. In one or more embodiments of the present disclosure, digital radio communication device (DRCD) nodes are disposed on the tanker and throughout the loading/unloading facility. The DRCD nodes are configured to measure distances within a short range. In particular, the distance is measured based on a timing measurement (e.g., packet-time-of-flight) between the DRCD nodes, such as between a DRCD node mounted on a compartment coupler of the tanker and another DRCD node mounted on a loading/unloading equipment of the loading/unloading facility. Accordingly, petroleum loading/unloading is facilitated in response to measuring the distance based on the packet-time-of-flight. For example, a potential cross coupling event may be detected prior to actual occurrence of the cross coupling to prevent incorrect loading or unloading. Embodiments offer the advantage of low retrofit cost and may serve other needs at loading terminals such as vehicle identification, vehicle position in the terminal, and data communications with the vehicle (e.g., transferring compartment information such as capacity, Bills of Lading, etc.).

FIG. 1 shows a system (100) in accordance with one or more embodiments. In one or more embodiments, one or more of the modules and elements shown in FIG. 1 may be omitted, repeated, and/or substituted. Accordingly, embodiments of the present disclosure should not be considered limited to the specific arrangements of modules shown in FIG. 1.

In one or more embodiments of the present disclosure, the system (100) is based on the short range digital active radiolocation technology to assist in managing activities related to vehicle transport of fluid (e.g., liquid, gas, and/or compressed gas) products. In particular, the system (100) includes a collection of devices that achieves identification, location, relative location, and wireless communications to provide assurances during activities such as loading, unloading, vehicle movement, asset movement, custody transfer, and providing information to personnel. In one or more embodiments, the system (100) includes a tanker (101) having a cab (101-1) and multiple compartments (e.g., compartment A (101-2), compartment B (101-3), etc.) and a loading/unloading facility (111) having various equipment (e.g., equipment A (111-1), equipment B (111-2), equipment C (111-3), etc.). Further, one or more DRCD nodes (e.g., DRCD node A (102) having a range A (102-1), DRCD node B (112) having a range B (112-1), etc.) are disposed throughout various locations of the tanker (101) and the loading/unloading facility (111). As shown in FIG. 1, the system (100) is based on the following terminology.

A node may comprise a device containing digital radio communications technology that may have a fixed or mobile location, and may transmit and receiving general information as well as measuring timing (e.g., used in determination of packet-time-of-flight) information such that distance and potentially position (between nodes) may be computed either on board or externally. Nodes may contain RF communications device(s) and computer processors, and may or may not contain additional processors, memory, non-volatile memory, sensors (such as but not limited to accelerometers, magnetometers, gyroscopes), display devices, buttons (or other human input devices), or indicator devices. In certain embodiments, nodes may take on one or more roles in its function, including, but not limited to communication, tag, and anchor (defined below).

The term "communication" may refer to a role of a node as configured to send/receive data packet(s) to/from other nodes. A single node may perform multiple roles within a communication system. For example, in an exemplary embodiment, a node disposed on a loading arm may function as both a tag and an anchor. In other embodiments, a note may function as either a tag or an anchor.

The term "tag" ("tagged") may refer to a role of a node as being mobile relative to other nodes.

The term "anchor" may refer to the role of a node as being fixed in location or relative to an object to which it is attached. An anchor may be attached to an object which is fixed or to an object which is mobile. In this way, the anchor may be either fixed or mobile from a global perspective, and is fixed from a local perspective. In a first exemplary embodiment, an anchor may be fixed to a stationary object, such as a piece of equipment at a terminal. The anchor may be fixed both relative to the piece of equipment and relative to a global perspective. In a second exemplary embodiment, an anchor may be fixed to a mobile object, such as a tanker or a loading arm. The anchor may be fixed relative to the tanker or the loading arm and mobile from a global perspective.

A tanker may comprise a vehicle used to transport fluid payload, such as liquids, liquefied gases, gases, compressed gasses, or refrigerated liquefied gases; including but not limited to road vehicles, boats/ships, aircraft, space vehicles (rockets), and rail cars. "Tanker" may also refer to the vehicle itself, for example, when undergoing fueling and other provisioning operations. Also, may be a service vehicle that is equipped with node(s), such as a meter prover truck (may or may not contain a storage tank).

A terminal may comprise a facility where tankers may be loaded and/or unloaded. Metering of product and/or custody transfer may or may not take place.

Recent developments in short range wireless digital communications technology allow for measurement of timing and deriving packet time-of-flight (reference IEEE802.15.4-2011) in a low cost economic package; this functionality allows for determination of distance between nodes and, with suitable geometry, relative position with resolution not available before in commonly available components. Current technology allows distance and position measurement with a resolution of about ±10 cm (±4 in) (reference "Deca-Wave", http://www.decawave.com/); this ability may be applied to tanker and terminal applications to achieve a synergistic mix of capabilities at a low-price point not achievable with other technologies.

One or more embodiments of the present disclosure provide operational assurances and features by affixing short range radiolocation technology (i.e., nodes) to fixed terminal facilities, mobile terminal equipment, tankers, tanker equipment (e.g., hose ends), and to other equipment such as computers, user interfaces, and network gateways, as described below.

Certain embodiments provide the functionality of controlling access (hereinafter "feature 1"). Tagged mobile asset (such as tankers) position may be wirelessly identified and identity authenticated for entry or exit from a terminal yard or other secure areas that require restricted access.

Certain embodiments provide the functionality of preventing loading product to the wrong tanker (hereinafter "feature 2"). Tagged load arm position relative to a tagged tanker may be used to determine if the arm is delivering to the correct tanker.

Certain embodiments provide the functionality of product cross-over (mixing) prevention (hereinafter "feature 3"). Tagged load arm relative position to a tagged tanker may be used to determine if the arm is delivering to the correct compartment coupling on a Tanker.

Certain embodiments provide the functionality of yard operations, such as queuing tankers (hereinafter "feature 4"). Position of tagged tankers in the terminal yard, including direction of travel (even when motionless), may be used to compute optimum queuing of loading stations, unloading stations, waiting areas, and other activities.

Certain embodiments provide the functionality of mobile asset collision warnings (hereinafter "feature 5"). Tagged mobile assets and tagged fixed assets relative positions may be computed and monitored to warn against hazardous situations; for example, a load arm is not retracted from a tanker.

Certain embodiments provide the functionality of product cross-over (mixing) prevention at drop locations (e.g., gas station) where tankers unload (hereinafter "feature 6"). Tanker anchors position the couplers and identify products available at each coupler, terminal area anchors position the tank filler locations and identify the product that is acceptable, and tagged hose ends determine which coupler is feeding which tank filler. A communicating device may then optionally display a go/no go indication to the operator and log information.

Certain embodiments provide the functionality of transferring tanker configuration information from the tanker to the terminal (hereinafter "feature 7"). Tanker configuration information may include identification, compartment count, compartment capacities, compartment coupler positions relative to the tanker anchors.

Certain embodiments provide the functionality of transferring tanker status to the terminal (hereinafter "feature 8"). Tanker status may include connected sensor information like compartment fluid levels, point level sensors (compartment empty/full status), last product loaded in each compartment (e.g., recalled from on-board memory written during the last load), tanker location history (e.g., gps log), product drop (e.g., unloading) logs, and other business related information that may be stored on board the Tanker.

Certain embodiments provide the functionality of information storage on the tagged tanker (hereinafter "feature 9"). The terminal automation system may store information in the node tagged on the tanker for purposes of identification or saving state information, similar to how web servers save "cookies" on a user's computer.

Certain embodiments provide the functionality of transferring information from terminal automation systems to the tanker and/or cab mounted devices such as Bills of Lading, product type just loaded into compartments, delivery locations and routing, driver instructions, and business information relating to the transaction or vehicle load (hereinafter "feature 10").

Certain embodiments provide the functionality of wireless communications to facilitate installation, configuration, and calibration of nodes, possibly using relative position information during the process (hereinafter "feature 11").

Certain embodiments provide the functionality of wireless communications, between proving trucks and terminal facilities, for proving the calibration of fluid metering equipment (hereinafter "feature 12"). For example, information such as the identity of the proving vehicle, which load arm is being used to flow product to the prover (ultimately which meter is being tested), and new meter factors (calibrations factors) may be communicated back to the terminal facility.

Certain embodiments provide the functionality of generating a map of the loading/unloading facility based at least on the distance between a tagged tanker and anchors disposed about the terminal yard (hereinafter "feature 13"). For example, the map may be displayed on a cab-mounted device of the tanker or a terminal automation system of the loading/unloading facility.

Figure 2:
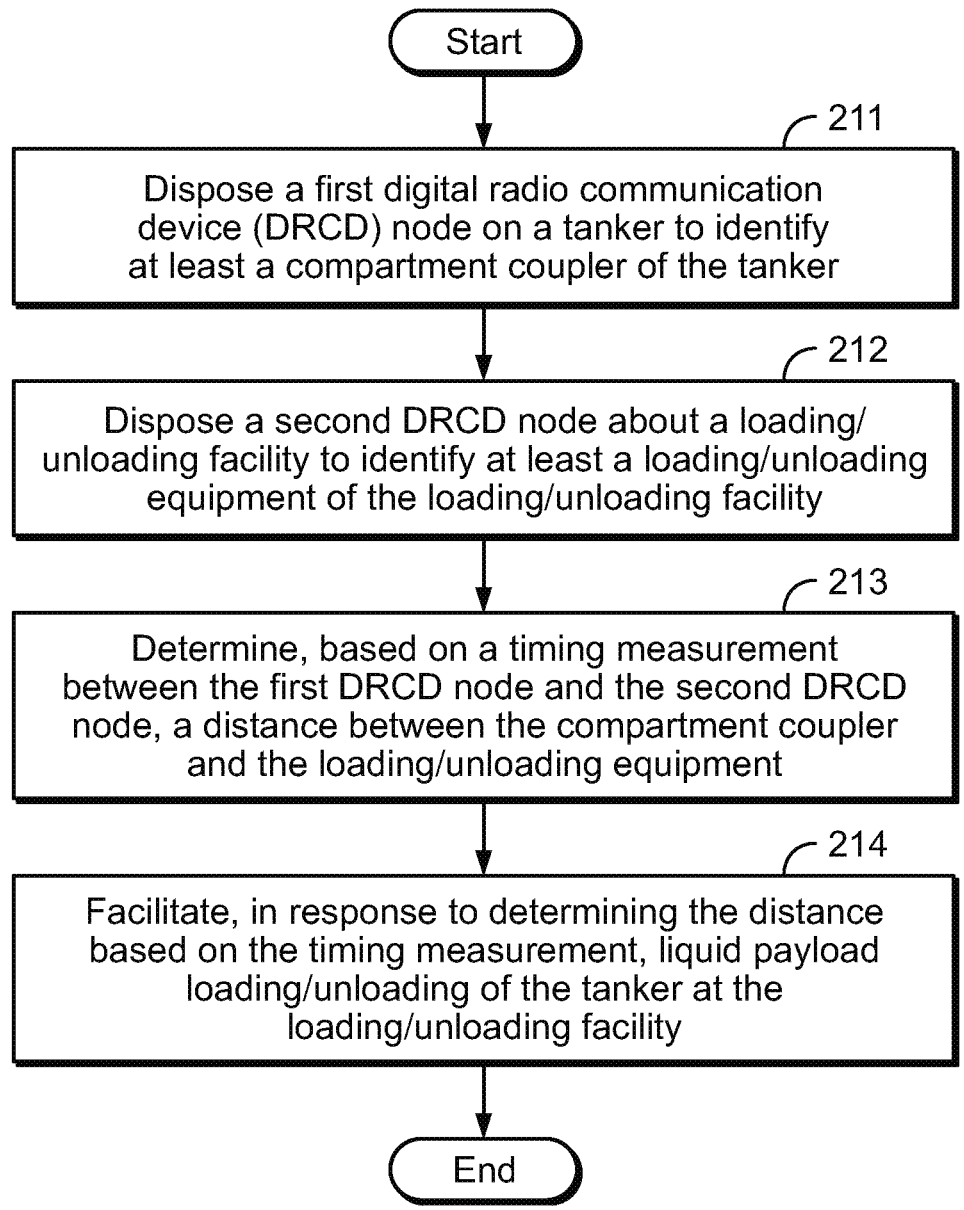
FIG. 2 shows a flowchart in accordance with one or more embodiments.

FIG. 2 shows a method flowchart in accordance with one or more embodiments. One or more blocks shown in FIG. 2 may be omitted, repeated, and/or performed in a different order among different embodiments. Accordingly, embodiments should not be considered limited to the specific number and arrangement of blocks shown in FIG. 2.

Initially, in Block 211, a first digital radio communication device (DRCD) node is disposed on a tanker to identify at least a compartment coupler of the tanker. For example, the first DRCD node may be mounted directly on the compartment coupler. In another example, the first DRCD may be mounted on a position with fixed geometry relative to the compartment coupler.

In Block 212, a second DRCD node is disposed about a loading/unloading facility to identify at least a loading/unloading equipment of the loading/unloading facility. For example, the second DRCD node may be disposed on a loading arm or a hose end of the loading/unloading facility. In another example, the second DRCD may be mounted on a position with fixed geometry relative to the loading arm or the hose end.

In Block 213, a distance between the compartment coupler and the loading/unloading equipment is determined based on a timing measurement (e.g., packet-time-of-flight) between the first DRCD node and the second DRCD node. In one or more embodiments, a data packet is sent from the first DRCD node to the second DRCD node. The packet may include a transmitting timestamp inserted by the first DRCD node to represent the time when the packet is sent from the first DRCD node. The second DRCD node may record a receiving timestamp to represent the time when the packet is received at the second DRCD node. Accordingly, the timing measurement (e.g., packet-time-of-flight) may be derived based on the transmitting timestamp and the receiving timestamp. For example, the timing measurement (e.g., packet-time-of-flight) may include a difference between the transmitting timestamp and the receiving timestamp. In one or more embodiments, deriving the timing measurement (e.g., packet-time-of-flight) may include a multi-step process involving back and forth communications between the first DRCD node and the second DRCD node. Based on the timing measurement (e.g., packet-time-of-flight), the distance may then be determined by multiplying the timing measurement and a pre-determined factor. For example, the pre-determined factor may correspond to a transmission speed of the data packet between the first DRCD node and the second DRCD node.

In Block 214, in response to determining the distance based on the timing measurement (e.g., packet-time-of-flight) between the first DRCD node and the second DRCD node, fluid payload loading/unloading of the tanker at the loading/unloading facility is facilitated. In one or more embodiments, the fluid payload includes petroleum or other liquefied gas. In one or more embodiments, a potential error condition is detected based on the measured distance. Accordingly, the loading/unloading of the tanker is adjusted or otherwise facilitated based on the detected error condition. Various example embodiments of detecting the error condition and facilitating the loading/unloading of the tanker are described in details below.

In one or more embodiments, facilitating loading/unloading of the tanker includes wirelessly identifying tagged mobile asset (such as tankers) position authenticating identity for entry or exit from a terminal yard or other secure areas that require restricted access.

In one or more embodiments, facilitating loading/unloading of the tanker includes preventing loading product to the wrong tanker. For example, tagged load arm position relative to a tagged tanker may be used to determine if the arm is delivering to the correct tanker.

In one or more embodiments, facilitating loading/unloading of the tanker includes preventing product cross-over (mixing) while at the loading facility. For example, tagged load arm relative position to a tagged tanker may be used to determine if the arm is delivering to the correct compartment coupling on a Tanker.

In one or more embodiments, facilitating loading/unloading of the tanker includes facilitating yard operations, such as queuing tankers. For example, position of tagged tankers in the terminal yard, including direction of travel (even when motionless), may be used to compute optimum queuing of loading stations, unloading stations, waiting areas, and other activities.

In one or more embodiments, facilitating loading/unloading of the tanker at the loading/unloading facility includes providing mobile asset collision warnings. For example, tagged mobile assets and tagged fixed assets relative positions may be computed and monitored to warn against hazardous situations; for example, a load arm is not retracted from a tanker.

In one or more embodiments, facilitating loading/unloading of the tanker includes preventing product cross-over (mixing) at drop locations (e.g., gas station) where tankers unload. For example, tanker anchors position the couplers and identify products available at each coupler, terminal/fuel station area anchors (one or several, which can be installed in/on fixed or mobile/portable/hand held devices) position the tank filler locations and identify the product that is acceptable, and tagged hose ends determine which coupler is feeding which tank filler. Alternative to tagged hose ends: portable/mobile/hand held device which identifies automatically or with the help of an operator, and communicates, the position of each hose end. A communicating device may then optionally display a go/no go indication to the operator or hinders the delivery (e.g. does not release the compressed air) and log information.

In one or more embodiments, facilitating loading/unloading of the tanker includes transferring tanker configuration information from the tanker to the terminal. For example, tanker configuration information may include identification, compartment count, compartment capacities, or compartment coupler positions relative to the tanker anchors.

In one or more embodiments, facilitating loading/unloading of the tanker includes transferring tanker status to the terminal. For example, tanker status may include connected sensor information like compartment fluid levels, point level sensors (compartment empty/full status), last product loaded in each compartment (e.g., recalled from on-board memory written during the last load), tanker location history (e.g., gps log), product drop (e.g., unloading) logs, and other business related information that may be stored on board the Tanker.

In one or more embodiments, facilitating loading/unloading of the tanker includes providing information storage on the tagged tanker. For example, the terminal automation system may store information in the node tagged on the tanker for purposes of identification or saving state information, similar to how web servers save "cookies" on a user's computer.

In one or more embodiments, facilitating loading/unloading of the tanker includes transferring information from terminal automation systems to the tanker and/or cab mounted devices such as Bills of Lading, product type just loaded into compartments, delivery locations and routing, driver instructions, and business information relating to the transaction or vehicle load.

In one or more embodiments, facilitating loading/unloading of the tanker includes using wireless communications to facilitate installation, configuration, and calibration of nodes, possibly using relative position information during the process.

In one or more embodiments, facilitating loading/unloading of the tanker includes generating a map of the loading/unloading facility based at least on the distance between a tagged tanker and anchors disposed about the terminal yard. For example, the map may be displayed on a cab-mounted device of the tanker or a terminal automation system of the loading/unloading facility.

Additional examples of facilitating petroleum loading/unloading of the tanker are described in reference to FIGS. 3, 4, 5, and 6 below.

FIGS. 3, 4, 5, and 6 show an example in accordance with one or more embodiments. In one or more embodiments, one or more of the modules and elements shown in FIGS. 3, 4, 5, and 6 may be omitted, repeated, and/or substituted. Accordingly, embodiments of the present disclosure should not be considered limited to the specific arrangements of modules shown in FIGS. 3, 4, 5, and 6.

Figure 3:
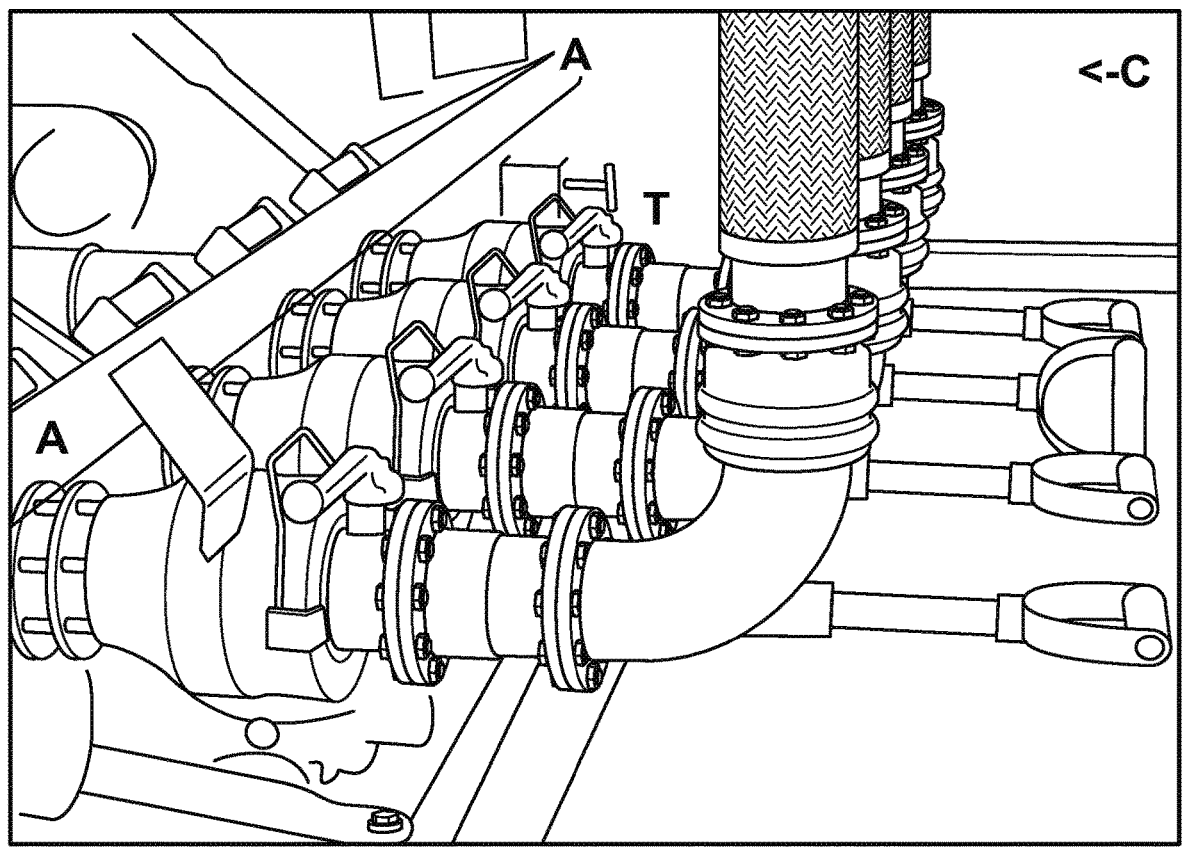
FIGS. 3, 4, 5, and 6 show an example in accordance with one or more embodiments.
Figure 4:
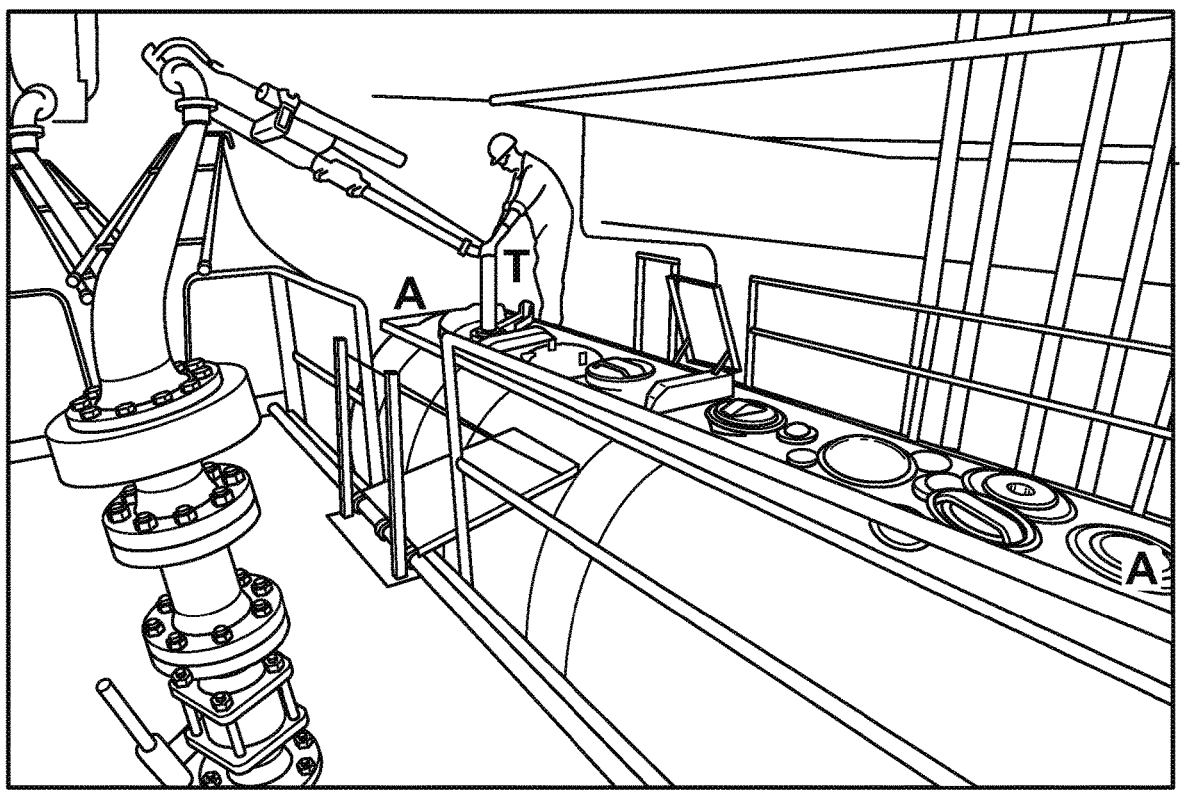

In particular, FIGS. 3 and 4 show examples of cross coupling prevention in a side-loading scenario and top-loading scenario, respectively. As shown in FIGS. 3 and 4, anchor nodes are mounted to the tanker in positions marked "A", tag nodes are mounted to each of the loading arms in positions marked "T", and a communications node mounted elsewhere (represented by a position marked "C") that is connected to a communications network, which is part of the terminal. In the side-loading scenario depicted in FIG. 3, a bottom loading tanker is shown where the couplers are on the side.

During the process of mounting and commissioning the anchor nodes, their mounting geometry relative to the compartment couplers on the tanker are determined and stored in the system. For example, the information may be stored in a non-volatile memory device imbedded in the anchor nodes. As an alternative, the geometry may be pre-specified and the mounting positions restricted to specific locations relative to the couplers.

During the process of mounting and commissioning the tag nodes, their mounting geometry relative to the load arm are determined and stored in the system. For example, the information may be stored in a non-volatile memory device imbedded in the tag nodes. As an alternative, the geometry may be pre-specified and the mounting positions restricted to specific locations relative to the load arms.

The tags on the load arms broadcast a unique identification code and the stored geometry. The broadcast may be periodic or triggered by a sensor that detects arm activity. The unique identification code is utilized to differentiate the broadcasts such that the identity of the arm may be determined.

The anchor nodes receive the tag broadcasts to compute possible positions of the load arm relative to the tanker couplings based on the received arm identification code, the tag geometry with respect to the arm, identification codes stored in the anchors, and message timing information. The received broadcasted information and/or the computed positions are then transmitted.

The communications node connected with other systems at the terminal receives the information transmitted from the anchors, and forwards the information to systems that may then use that information to ensure that the load arm is connected to the correct tanker (e.g., using the anchor identification codes), and to the correct compartment coupler using the relative position computations.

As the nodes are part of a wireless network, the system is flexible as to where the computations take place to achieve the purpose. For example, the tag and anchor nodes may simply forward the basic information cited above, and the computations performed on a computer that is part of the terminal system.

Figure 5:
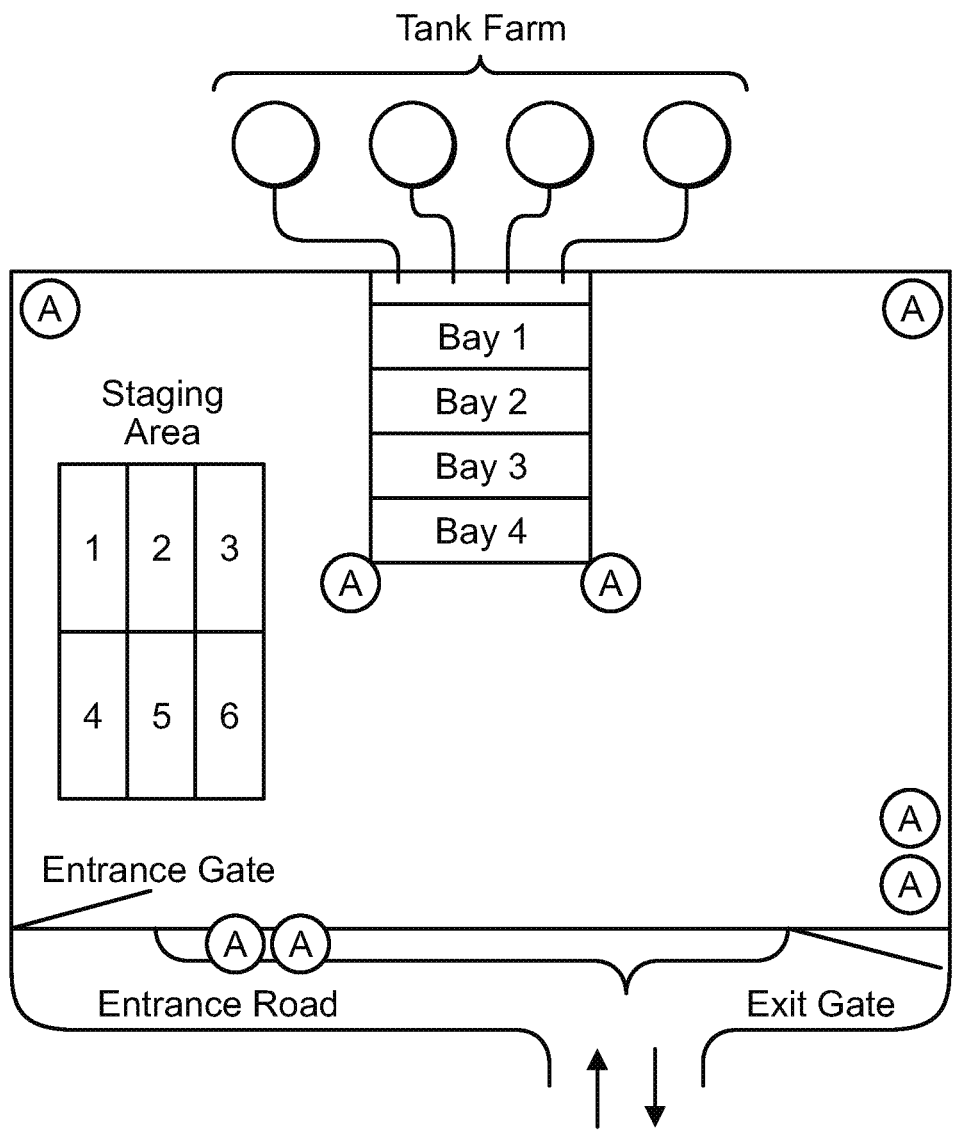
Figure 6:
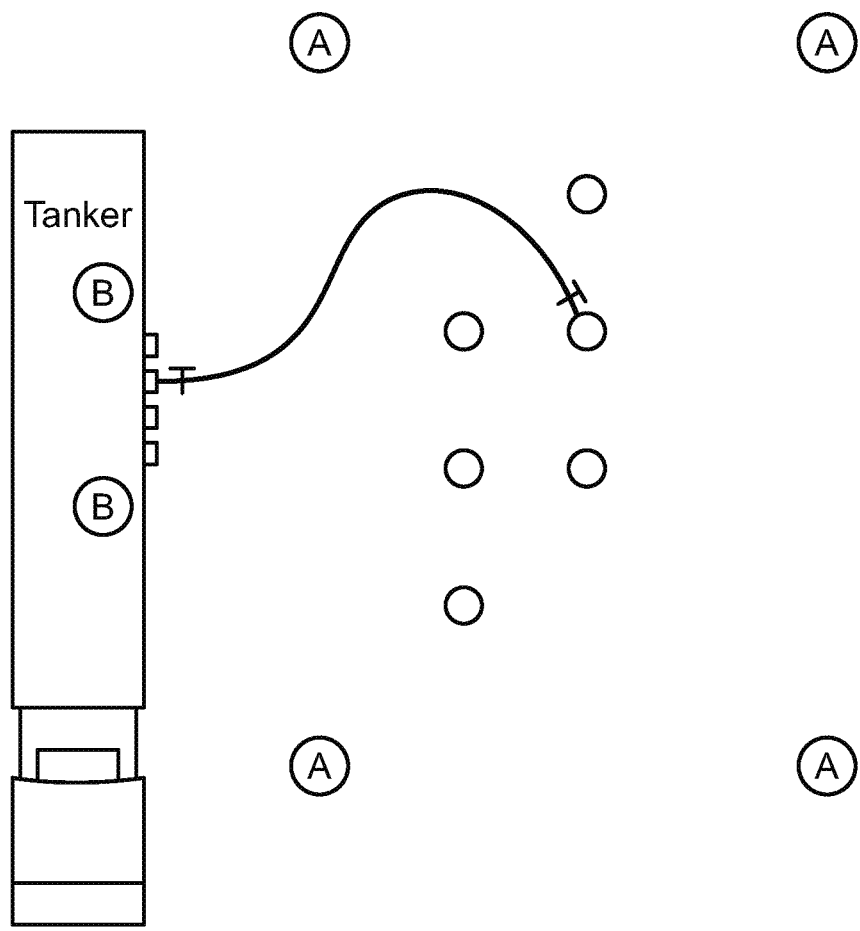

FIGS. 5 and 6 show additional examples of loading/unloading facility operations in accordance with one or more embodiments. In particular, FIG. 5 shows a schematic layout diagram of a road tanker loading yard. FIG. 6 shows a schematic layout diagram of a gas station (drop point).

Consider a road tanker equipped with anchor nodes (e.g., as shown in FIGS. 3 and 4) as well as a communications node equipped user interface (e.g., with a printer) in the truck cab. This cab mounted system also contains a GPS and memory. The tanker is also equipped with level sensing devices in the compartments that interfaced with the wireless nodes that communicate with either (or both) the cab unit and terminal yard systems. Note that functionality described below assumes this configuration, but there is flexibility in where the devices may be mounted. For example, the GPS may be connected to the tanker nodes, rather than the cab device. Finally, the tanker is equipped with an unloading hose, which has a tag node affixed to each end, and these nodes have been previously configured to identify each other as being attached to the same hose.

Further, consider a loading yard (as shown in FIG. 5) equipped with a tag node on each loading arm (located in "bays"), and other anchor nodes (denoted as "A" within a circle) located around the facility with a known geometry useful for computing location information from timing measurements (e.g., measured packet-time-of-flight, derived from differential timing of multiple packets, etc.). The loading yard is equipped with an entrance gate, a staging area, the loading bays, and an exit gate.

Finally, consider a gas station (as shown in FIG. 6) that has anchor nodes (one or several) positioned such that the gas station tank coupling positions on the ground are mapped and the configuration stored in memory contained in the nodes. This may include the possibility that these nodes are located in the lids of the gas station receptacles, or in one or several fixed or mobile/portable/hand held devices, placed at the locations marked A in a circle on FIG. 6 or at other locations at the fuel station.

As the tanker approaches the entrance gate, the fixed nodes in the yard communicate with the nodes affixed to the tanker as they come into communications range and forward identification (e.g., based on feature 7) and tanker position (e.g., based on feature 4) (e.g., derived from packet-time-of-flight) information to the terminal computer system. The terminal system determines by position that the tanker is first in line of potentially more tankers ready to enter the gate, and by database lookup using the identification, that it is authorized to access the facility; the gate is then opened to permit access (e.g., based on feature 1). The cab mounted node also transmits to the terminal system a GPS log (e.g., based on feature 10) and level sensor log which are stored (e.g., based on feature 8) and may be used to determine, for example, that the previous load was dropped (unloaded) at specific GPS coordinates. Further, the operator in the tanker cab desires to load 1500 gallons of gasoline and 500 gallons of diesel, and has entered this into the user interface located in the cab. The radio node in the cab transmits this "fuel order" information to the terminal system (e.g., based on feature 10), and the terminal uses the position information of the cab node related to the position information from the tanker (trailer) nodes to determine that this operator is hauling the specified tanker trailer (trucker in cab is identified with the tanker asset) (e.g., based on feature 4). The terminal system examines the fuel order transmitted by the trucker, and determines that a loading bay for gasoline is available, and sends a message to the cab user interface directing the trucker to that specific bay (e.g., based on feature 4).

The trucker proceeds to that bay, and couples the gasoline arm to a tanker compartment. The terminal system determines that the loading arm is connected to the correct tanker using the identity and position of the tanker relative to the arm (e.g., based on feature 2). Further, using the cross-coupling features described above, the terminal system determines that the gasoline arm is coupled to a compartment last used for diesel (e.g., based on feature 3) (the compartment last use information may come from information stored in the tanker nodes written during the last load, or from a database that is part of the terminal system that has the last load and tanker/compartment recorded). The terminal system does not allow delivery to start because it would cause a cross contamination condition, and the trucker is then informed that the coupling is incorrect. After the trucker changes the loading arm to the correct compartment, the level sensor information (live readings) and the compartment capacity (stored during configuration) for the compartment to which the arm is connected is requested and transmitted to the terminal system (e.g., based on features 7 and 8), which determines that the compartment still has a partial load aboard (the level is not "empty"). The Terminal system then discloses this to the trucker through a user interface, who then opts to reduce his order volume. The terminal system affirms that there is enough remaining capacity aboard the tanker to accept the requested order, and permits loading to take place. Once the gasoline order is loaded, the terminal system transmits the product type loaded to the tanker, where that information is stored on board for future use (e.g., based on feature 9). The trucker disconnects the arm and returns to the cab, where the cab user interface display instructs the trucker to report to a staging area because no diesel loading arms are available at that time (e.g., based on feature 4).

While waiting in the staging area, the terminal detects the diesel bay is free (using position information from the Tanker previously occupying that bay) (e.g., based on feature 4), but also determines the tanker in the staging area is behind another (by using position information) (e.g., based on feature 4), and sends a message to the cab of the other trucker (in front) that he is next to load (e.g., based on feature 10).

Suppose the terminal has two diesel loading bays; the terminal senses (by position) that one of these bays is occupied by a proving truck (also equipped with a node) (e.g., based on feature 7). Further, the loading arm connected to the prover truck transmits its identity, and the node on the prover truck determined the arm identity to which it is coupled (e.g., based on feature 2); this information is wirelessly forwarded to the terminal system, which uses the arm identity to look up which meter is on that line (the meter being proved), and forwards the meter identity back to the prover truck. Thus, the meter being proven is automatically identified to the system aboard the prover truck. After proving runs are done, the new meter factors are forwarded back to the terminal system (e.g., based on feature 8) which then records the activity and sets the new meter factors (calibration) into the meter.

While this is taking place, the other diesel bay is cleared, and the example trucker waiting in the staging area is instructed to report to the open diesel bay using the wireless protocol and the cab user interface (e.g., based on feature 10); however, the trucker pulls into the wrong bay. The terminal system, using position information derived from the tanker nodes and the fixed terminal nodes (e.g., based on feature 4), notifies the trucker of the error via the cab user interface (e.g., based on feature 10), and the trucker moves to the correct bay. The trucker loads diesel without further issue.

When the trucker attempts to pull clear of the bay, he sees a red light indicating he should not move his Tanker; this light is controlled by the terminal system, which has used the measured distance between the loading arm and the tanker to determine that there is a hazard present (e.g., based on feature 5) (the tagged load arm is still coupled to the tanker, for example). The trucker then examines the situation and finds that the load arm has been uncoupled, but has not been retracted far enough away from the tanker and still presents a hazard. After retracting all the load arms away from the tanker, he is then signaled a green light and pulls clear of the bay. The nodes in the yard detect (by position) that the truck is clear of the bay (e.g., based on feature 4), and instructs the next trucker waiting that the bay is now available (e.g., based on features 4 and 10).

The trucker then makes his way to the exit gate, and while doing so, the terminal system transmits the Bill of Lading to the cab user interface (e.g., based on feature 10), which prints it on the connected printer. While pausing at the exit gate, the trucker "signs" the Bill of Lading using the user interface, and the signature is transmitted back to the terminal system, which then authorizes exit and opens the exit gate (e.g., based on feature 1).

With reference to FIG. 6, the trucker proceeds to the gas station where the load will be deposited; the GPS may log the route taken. The trucker connects the discharge hose, for example, to the diesel compartment on the tanker and the other end of the hose to, for example, a gasoline tank at the gas station (an incorrect coupling). The cab unit (or a separate node equipped unit mounted on the tanker) is communicating with the anchor nodes on the tanker (denoted as "B" in a circle) and the tag node on the hose end (denoted as "T") and uses relative position to determine that one end of the hose is connected to the diesel compartment on the Tanker (e.g., based on feature 2). Further, the same unit communicates with the anchor node or nodes at the gas station (installed in/on one or several fixed or mobile/portable/hand held devices, placed at the locations marked A in a circle on FIG. 6 or at other locations at the fuel station), and the tag node at the other end of the hose to determine, by relative positions, that it is connected to the gasoline tank at the station. In some embodiments, a portable/mobile/hand held device which identifies automatically or with the help of an operator, and communicates, the position of each hose end, may be used as an alternative to, or in addition to, tagged hose ends.

Finally, the unit identifies the hose end tag nodes as belonging to the same hose, so it can determine the hose is coupling the diesel compartment to a gasoline tank (e.g., based on feature 6), and then signals the trucker visually and/or audibly that the connection is incorrect. Further, if the tanker is so equipped, the unit could prevent opening the valve or running a pump so as to avoid discharging the load. The trucker then moves the hose to the station diesel tank, and using the same process, the unit may determine the connection is correct, and signal "okay" to the trucker and allow the valve to be opened. The unit also may record the tanker compartment level drop using the level sensor, along with the GPS location information into internal memory to be transferred upon return to the loading terminal yard (e.g., based on feature 8). The trucker finishes discharging the tanker contents, and returns to the terminal for another load.

An addition to the service station drop scenario may include the service station anchors interfacing with sensors and transmitting additional data, such as level sensors mounted in the service station tanks. This data may be used to prevent starting a drop into a tank without enough remaining capacity (overfill prevention), and storing and/or forwarding the tank level data to a business system to determine, for example, when to buy more and in what quantity. The service station anchors may be configured with and transmit information to the truck including tank capacities.

Loading/unloading facility operations in accordance with one or more embodiments may also include hybrid operations. An operation may include elements described above, especially with respect to FIGS. 5-6, and may also include other types of tracking means.

In some embodiments, different tracking means may be used at different points in the operation. For example, barcodes, RFID tags, ultra-wideband tags, GPS trackers, and/or other types of trackers may be used to identify elements of the system described above at different stages of the operation. In some embodiments, two or more types of tracking means may be used. In some cases, a hybrid system may have reduced costs and/or complexity compared to a non-hybrid system, may allow tracking means which are already installed on equipment to be used in conjunction with the tracking system described above, and may allow different types of tracking systems to be merged easily.

In an exemplary embodiment, tracking within a terminal may be performed using nodes as described above. Nodes may be attached to both a tanker and to loading equipment at the terminal to facilitate loading of the tanker within the terminal. Nodes may also facilitate movement of the tanker within the terminal, for example from the entrance of the terminal, to the loading site, and to the exit. Tracking outside of the terminal may be performed using a different tracking means. For example, barcodes, RFID tags, ultra-wideband tags, or GPS trackers may be used to track the movement and operations of the tanker outside of the terminal. The second type of tracking means may be attached to the tanker in addition to the nodes described above. In some cases, the second type of tracking means may be disposed at a service station drop, or a service station drop may include a reader which works in conjunction with the second type of tracking means, for example a barcode scanner.

Although an exemplary case is described above, one skilled in the art will readily recognize that different types of tracking means may be combined within the system in many different ways. For example, nodes as described above may be used outside of a terminal while a different tracking means is used within the terminal. For another example, different service station drops may use different types of tracking means. All necessary types of tracking means may be attached to a tanker to be read at the different service station drops. Further, any type of tracking means known in the art may be used, in addition to those described explicitly herein.

Embodiments may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities. In one or more embodiments, various features (e.g., one or more of the feature 1 through feature 13) of the system (100) depicted in FIG. 1 above are implemented using at least the computing system (700). In one or more embodiments, the method flowchart depicted in FIG. 2 above is performed using at least the computing system (700).

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a fluid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments. In one or more embodiments, various features (e.g., one or more of the feature 1 through feature 11) of the system (100) depicted in FIG. 1 above are implemented using at least a loading/unloading manager, which is a software application having a collection of computer readable program codes. In one or more embodiments, the method flowchart depicted in FIG. 2 above is performed using at least the loading/unloading manager.

The computing system (700) in FIG. 7.1 may be connected to or be a part of a network. For example, as shown in FIG. 7.2, the network (720) may include multiple computing nodes (e.g., computing node X (722), computing node Y (724)). Each computing node may correspond to a computing system, such as the computing system shown in FIG. 7.1, or a group of computing nodes combined may correspond to the computing system shown in FIG. 7.1. The computing nodes depicted in FIG. 7.2 are distinct from the DRCD nodes described above. By way of an example, embodiments may be implemented on a computing node of a distributed system that is connected to other computing nodes. By way of another example, embodiments may be implemented on a distributed computing system having multiple computing nodes, where each portion may be located on a different computing node within the distributed computing system. Further, one or more elements of the aforementioned computing system (700) may be located at a remote location and connected to the other elements over a network.

Although not shown in FIG. 7.2, the computing node may correspond to a blade in a server chassis that is connected to other computing nodes via a backplane. By way of another example, the computing node may correspond to a server in a data center. By way of another example, the computing node may correspond to a computer processor or micro-core of a computer processor with shared memory and/or resources.

The computing nodes (e.g., computing node X (722), computing node Y (724)) in the network (720) may be configured to provide services for a client device (726). For example, the computing nodes may be part of a cloud computing system. The computing nodes may include functionality to receive requests from the client device (726) and transmit responses to the client device (726). The client device (726) may be a computing system, such as the computing system shown in FIG. 7.1. Further, the client device (726) may include and/or perform at least a portion of one or more embodiments.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of computing nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens. For position-based data, the token(s) at the position(s) identified by the extraction criteria are extracted. For attribute/value-based data, the token(s) associated with the attribute(s) satisfying the extraction criteria are extracted. For hierarchical/layered data, the token(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 7.1 and the computing nodes and/or client device in FIG. 7.2. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method comprising:
    determining, based on a timing measurement between a first digital radio communication device (DRCD) node and a second DRCD node, a distance between the first DRCD node disposed on a tanker and the second DRCD node disposed about a loading arm or a hose end of a loading/unloading facility; and
    facilitating, in response to determining the distance based on the timing measurement, fluid payload loading/unloading of the tanker at the loading/unloading facility.

2. The method of claim 1,
    wherein the first DRCD node is disposed on the tanker to identify a position of at least a compartment coupler of the tanker;
    wherein the second DRCD node is disposed about the loading arm or the hose end of the loading/unloading facility to identify the position of at least a loading/unloading equipment of the loading/unloading facility.

3. The method of claim 2, wherein facilitating loading/unloading of the tanker comprises:
    detecting, in response to measuring the distance, a mismatch between the tanker and the loading/unloading equipment; and
    preventing, in response to detecting the mismatch, fluid payload loading/unloading of the tanker from the loading/unloading equipment.

4. The method of claim 2, wherein facilitating loading/unloading of the tanker comprises:
    detecting, in response to measuring the distance, a mismatch between the compartment coupler and the loading/unloading equipment; and
    preventing, in response to detecting the mismatch, fluid payload loading/unloading of the tanker via the compartment coupler from the loading/unloading equipment.

5. The method of claim 4, further comprising:
    presenting, in response to detecting the mismatch, a go/no go indication to an operator of the tanker or of the loading/unloading facility.

6. The method of claim 1, wherein facilitating loading/unloading of the tanker comprises:
    wirelessly identifying the position of the tanker; and
    authenticating, based at least on the position of the tanker, the tanker for entry or exit from a secure area of the loading/unloading facility.

7. The method of claim 1, wherein facilitating loading/unloading of the tanker comprises:
    wirelessly identifying the position of the tanker; and
    determining, based at least on the position of the tanker, optimum queuing of loading stations, unloading stations, and waiting areas of the loading/unloading facility.

8. The method of claim 1, wherein facilitating loading/unloading of the tanker comprises:
    wirelessly identifying the position of the tanker; and
    generating, based at least on the position of the tanker, a collision warning.

9. The method of claim 1, wherein facilitating loading/unloading of the tanker comprises:
    transferring tanker configuration information from the tanker to the loading/unloading facility,
    wherein the tanker configuration information comprises at least one selected from a group consisting of an identification, a compartment count, a compartment capacity, a compartment coupler position relative to the first DRCD node.

10. The method of claim 1, wherein facilitating loading/unloading of the tanker comprises:
    transferring tanker status to the loading/unloading facility, wherein the tanker status comprises at least one selected from a group consisting of a compartment fluid level, a compartment empty/full status, last product loaded in each compartment, a tanker location history, and a product drop log.

11. The method of claim 1, wherein facilitating loading/unloading of the tanker comprises:
providing, using the first DRCD node, information storage on the tanker for use by a terminal automation system of the loading/unloading facility.

12. The method of claim 11, wherein facilitating loading/unloading of the tanker comprises:
transferring information from the terminal automation system to a cab-mounted device of the tanker,
wherein the information comprises at least one selected from a group consisting of a Bill of Lading, a loaded product type in each compartment, delivery locations and routing, driver instructions, and business information relating to a transaction or vehicle load.

13. The method of claim 1, wherein facilitating loading/unloading of the tanker comprises:
facilitating installation, configuration, and calibration of the first DRCD node or the second DRCD node.

14. The method of claim 1, wherein facilitating loading/unloading of the tanker comprises:
generating a map of the loading/unloading facility based at least on the distance between the first DRCD node and the second DRCD node; and
displaying the map on a cab-mounted device of the tanker or a terminal automation system of the loading/unloading facility.

15. A computer program product comprising computer readable program code for:
determining, based on a timing measurement between a first digital radio communication device (DRCD) node and a second DRCD node, a distance between the first DRCD node disposed on a tanker and the second DRCD node disposed about a loading arm or a hose end of a loading/unloading facility; and
facilitating, in response to determining the distance based on the timing measurement, fluid payload loading/unloading of the tanker at the loading/unloading facility.

16. The computer program product of claim 15,
wherein the first DRCD node is disposed on the tanker to identify a position of at least a compartment coupler of the tanker;
wherein the second DRCD node is disposed about the loading arm or the hose end of the loading/unloading facility to identify the position of at least a loading/unloading equipment of the loading/unloading facility.

17. A distribution system comprising:
one or more computer processors;
a terminal automation system comprising instructions, when executed, cause the one or more computer processors to:
determine, based on a timing measurement between a first digital radio communication device (DRCD) node and a second DRCD node, a distance between the first DRCD node disposed on a tanker and the second DRCD node disposed about a loading arm or a hose end of a loading/unloading facility; and
facilitate, in response to determining the distance based on the timing measurement, fluid payload loading/unloading of the tanker at the loading/unloading facility;

a first plurality of DRCD nodes, disposed on the tanker, comprising the first DRCD node;
a second plurality of DRCD nodes, disposed about the loading/unloading facility, comprising the second DRCD node;
the tanker comprising a compartment coupler, wherein the first DRCD node is disposed on the tanker to identify a position of at least the compaitment coupler; and
the loading/unloading facility comprising a loading/unloading equipment, wherein the second DRCD node is disposed about the loading arm or the hose end of the loading/unloading facility to identify the position of at least the loading/unloading equipment.

18. The distribution system of claim 17,
wherein the tanker further comprises a first portion of the terminal automation system, and
wherein the loading/unloading facility further comprises a second portion of the terminal automation system.

19. The distribution system of claim 17, wherein the instructions, when executed, further cause the one or more computer processors to:
detect, in response to measuring the distance, a mismatch between the tanker and the loading/unloading equipment; and
prevent, in response to detecting the mismatch, fluid payload loading/unloading of the tanker from the loading/unloading equipment.

20. The distribution system of claim 17, wherein the instructions, when executed, further cause the one or more computer processors to:
detect, in response to measuring the distance, a mismatch between the compailinent coupler and the loading/unloading equipment; and
prevent, in response to detecting the mismatch, fluid payload loading/unloading of the tanker via the compartment coupler from the loading/unloading equipment.

21. The distribution system of claim 17,
wherein the instructions, when executed, further cause the one or more computer processors to present, in response to detecting the mismatch, a go/no go indication to an operator of the tanker.

22. The distribution system of claim 17, wherein the instructions, when executed, further cause the one or more computer processors to:
wirelessly identify the position of the tanker; and
authenticate, based at least on the position of the tanker, the tanker for entry or exit from a secure area of the loading/unloading facility.

23. The distribution system of claim 17, wherein the instructions, when executed, further cause the one or more computer processors to:
wirelessly identify the position of the tanker; and
determine, based at least on the position of the tanker, optimum queuing of loading stations, unloading stations, and waiting areas of the loading/unloading facility.

24. The distribution system of claim 17, wherein the instructions, when executed, further cause the one or more computer processors to:
wirelessly identify the position of the tanker; and
generate, based at least on the position of the tanker, a collision warning.

25. The distribution system of claim 17, wherein the instructions, when executed, further cause the one or more computer processors to:

transfer tanker configuration information from the tanker to the loading/unloading facility,
wherein the tanker configuration information comprises at least one selected from a group consisting of an identification, a compathnent count, a compathnent capacity, a compartment coupler position relative to the first DRCD node.

26. The distribution system of claim 17, wherein the instructions, when executed, further cause the one or more computer processors to:
transfer tanker status to the loading/unloading facility,
wherein the tanker status comprises at least one selected from a group consisting of a compailinent fluid level, a compartment empty/full status, last product loaded in each compaitment, a tanker location history, and a product drop log.

27. The distribution system of claim 17,
wherein the first DRCD node comprises information storage on the tanker for use by the first portion and the second portion of the terminal automation system to exchange information.

28. The distribution system of claim 17,
wherein the tanker further comprises a cab-mounted device,
wherein the instructions, when executed, further cause the one or more computer processors to transfer information to the cab-mounted device, and
wherein the information comprises at least one selected from a group consisting of a Bill of Lading, a loaded product type in each compaitinent, delivery locations and routing, driver instructions, and business information relating to a transaction or vehicle load.

29. The distribution system of claim 17, wherein the instructions, when executed, further cause the one or more computer processors to:
facilitate installation, configuration, and calibration of the first DRCD node or the second DRCD node.

30. The distribution system of claim 18, wherein the instructions, when executed, further cause the one or more computer processors to:
generate a map of the loading/unloading facility based at least on the distance between the first DRCD node and the second DRCD node.

31. The distribution system of claim 17, further comprising one or more service station drops, and wherein a transfer of material from the tanker to the one or more service station drops is tracked.

32. The distribution system of claim 31, wherein the transfer of material from the tanker to the service station drops is tracked via barcode, RFID tags, ultra-wideband trackers, or GPS trackers.

* * * * *